Dec. 19, 1967  G. NEWMAN  3,359,030
BUMPER GUARD ASSEMBLY
Filed Dec. 16, 1966
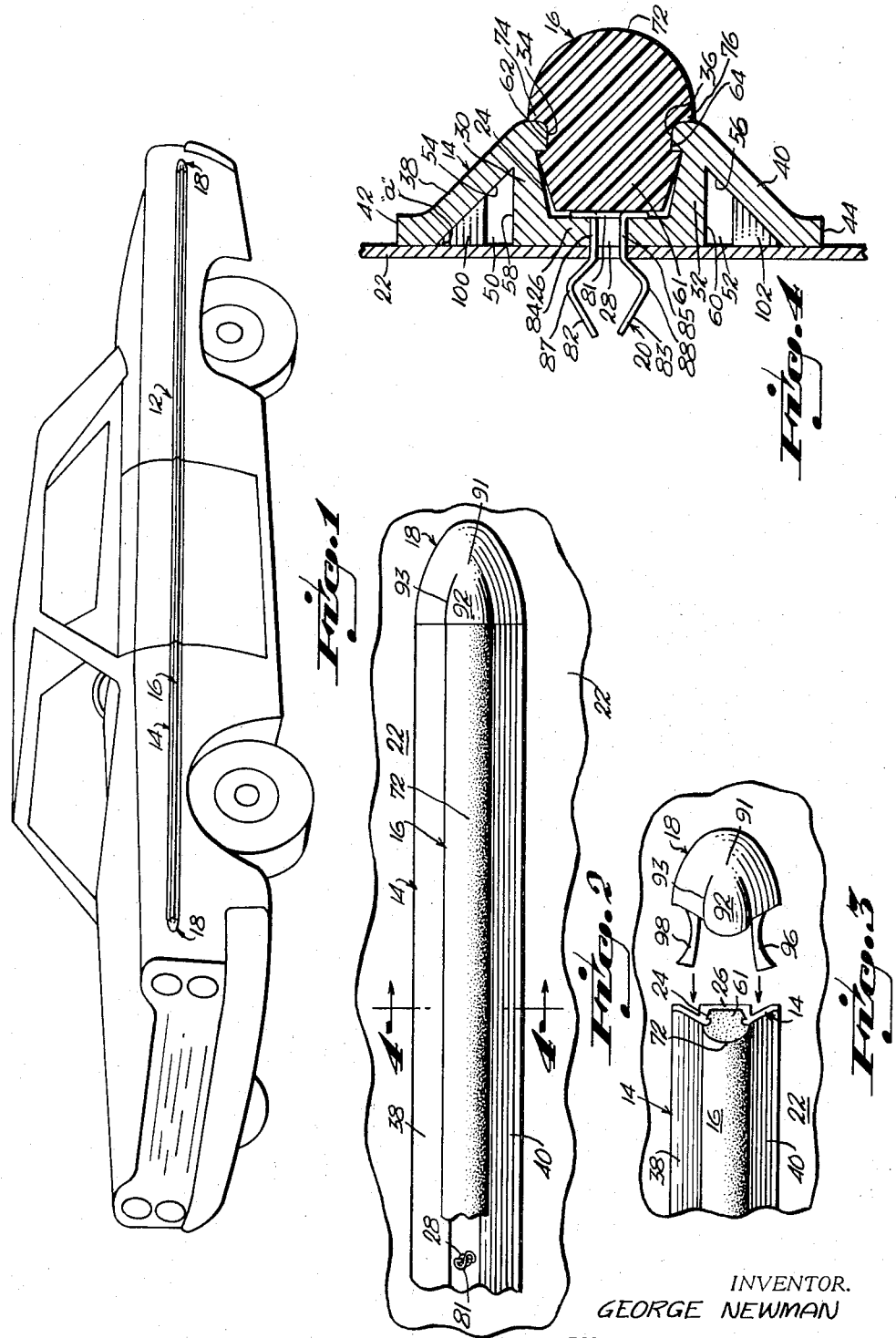
INVENTOR.
GEORGE NEWMAN
BY John Cyril Malloy
ATTORNEY.

United States Patent Office 3,359,030
Patented Dec. 19, 1967

3,359,030
BUMPER GUARD ASSEMBLY
George Newman, 1805 NE. 117th Road,
Miami, Fla. 33161
Filed Dec. 16, 1966, Ser. No. 602,201
4 Claims. (Cl. 293—1)

ABSTRACT OF THE DISCLOSURE

A bumper guard particularly adapted for ready mounting on the exterior of vehicle door or body panels, in which the guard includes an elongated holder having a relatively broad base and forming with the element upon which it is mounted end openings for receiving an end cap therein, and in which a yieldable elongated bumper element is deformed into an outwardly opening groove of the holder having confronting ledges extending therein and which grippingly engage the bumper element, and in which the bumper element has an upper crown including lateral shoulder portions susbtantially overlying upper surface portions of the holder at opposite sides of the outwardly opening groove.

---

This invention relates to a bumper guard, and, more particularly to a bumper guard to be installed on the body of an automobile vehicle along the sides thereof on that portion of the surface which projects the furthest laterally so that when the car is parked and the doors of adjacent cars, are opened, it will, if it bumps the vehicle on which the bumper guard is installed, hit the crown of the bumper guard which will cushion the blow and protect the finish of the automobile.

It is, accordingly, an object of this invention to provide a bumper guard which includes an elongate member to hold a bumper body and cushion blows from an adjacent vehicle without damage to the automobile.

It is another object of this invention to provide a bumper guard which includes an elongate holder member of channel form having a web and means included to connect the web along the body, the recess of the channel member being formed and sized such as to hold a companionately sized and shaped bumper guard and body having a base within the recess of the channel member and a crown portion extending beyond the channel member to yieldingly respond to impact by swinging car doors of an adjacent car.

It is another object of this invention to provide a bumper guard of the type described herein after which includes a channel member adapted to be connected along the length of a car, a bumper body including a base captivated in the channel, means to connect the channel to the automobile panel on the side of an automobile, and end cap means to trim and hold the bumper body within the recess of the channel member in combination with confronting projections along the length of the channel member spaced above the web of the channel member which interengage an elongate recess along the length of the bumper body base.

It is another object of this invention to provide a body guard for an automobile which is simple and inexpensive to manufacture and install and which is readily adapted to protect the side surface of an automobile against impacts caused by swinging doors of adjacent vehicles such as occur on many occasions in parking lots.

In accordance with these and other objects which will become apparent hereinafter, this invention will now be described with reference to the accompanying drawings in which:

FIGURE 1 is a perspective view of an automobile having the instant invention installed;

FIGURE 2 is a partial view which has been partly broken away and which illustrates a portion of the bumper guard installed on an automobile vehicle panel;

FIGURE 3 is an exploded view of the end of the bumper guard; and

FIGURE 4 is a view in cross section taken along the plane indicated by the line 4—4 of FIGURE 2 and looking in the direction of the arrows.

Referring to the drawings, wherein like reference characters designate like or corresponding parts throughout the different views, and referring particularly to FIGURE 1, the bumper guard is generally designated by the numeral 12 and, as can be seen in FIGURE 3, it includes an elongate holder 14, an elongate bumper body 16 which is keyed to the holder, and an end cap 18 which is arranged to hold the bumper body in the holder; means are provided comprising the clip 20 which hold the bumper guard to the panel 22 of a vehicle to which it is installed.

In more detail, the elongate holder is a member of uniform cross section including a channel portion 24 having a web 26 provided with spaced holes 28 therealong in the web and centrally between upstanding walls 30 and 32 of the elongate member. Each of the walls is provided with a ledge 34 and 36 which are arranged in confronting relation extending toward but not to one another and in the embodiment shown are arranged at the rim of the elongate holder. Flanges 38 and 40 are provided which may generally be described as of ogee configuration for decorative purposes; these flanges extend to the main plane of the web at which point they flare out providing feet 42 and 44 which are adapted to rest on the panel of a door in combination with the exterior surface of the web. The flanges trace an arcuate path as seen in cross section and define a longitudinally extending slot 50 and 52 between the interior surface 54 and 56 of the flanges and the outer surfaces 58 and 60 of the walls of the elongate channel form holder.

The bumper body is of elongate uniform cross section and includes a base 61 sized for snug sliding receipt between the walls and the web of the elongate holder and the base is provided with a longitudinally extending recess 62 and 64 on the opposite sides of the base which are sized to inter-engage with the ledge to nest within the channel and act with the ledges to key the body and the member to resist forces of withdrawal of the bumper body out of the channel in a direction perpendicular to the plane of the web. The bumper body also includes a central dome-shaped crown portion 72 of a diameter greater than the distance between the walls of the elongate holder at the terminal edges thereof so as to define a shoulder 74 and 76 to support the crown; it being noted in the embodiment shown that the shoulders are at the rim of the upstanding walls so that the crown protectively covers the main portion of the terminal edge of the holder to resiliently and protectively overlay the same.

The means to connect the combination of the bumper guard in the embodiment shown comprises a spring clip having a head 81 from which there project legs 82 and 83 which include a straight proximal portion 84 and 85 of a sufficient length to project through the thickness of the web and that of a panel of a thickness less than 16 gauge and with the distal portions of each leg including a dog leg bend 87 and 88 so that the terminal ends of the legs confront one another extending along paths which intersect and with the included angle between the dog leg bend and the proximal portion of the legs defining an angle sufficient to inter-engage with the hole of the panel and web to hold the bumper body guard in position on an automobile surface.

The end cap of the bumper guard comprises a body portion 91 having a top portion 92 which smoothly merges and blends in a fair curve 93 as seen in FIGURE 3 to a point of maximum cross sectional area which is substantially the same as that of the crown 72 of the bumper body and with the body portion having a dimension such as to conform to the ogee type cross section of the channel member, all as is apparent from FIGURE 1 at the terminal ends of the bumper guard. The end caps each include a pair of legs 96 and 98, the terminal ends of which are triangular in shape as seen in FIGURE 4 and which are designated by the numerals 100 and 102. The intermediate portion of the legs is of a minimum cross sectional area with the thickness of the legs being gradually of increasing cross sectional area from the intermediate portion of minimum cross sectional area to the proximal connection to the end cap and the terminal ends of the respective legs. The end cap is of resilient plastic material and the cross sectional area of the terminal portion of the legs is less than the cross sectional area of the slot and the angle $a$ at the terminal portion of the legs is companionate to the included angle between the plane of the web and the feet of the elongate holder and the flange so that in effect the outer point of the terminal or distal end of each of the legs bites into and tightly holds against removal of the end cap which is accomplished by pressing the terminal ends of the legs together and pushing them forcibly into the slots of the channel member until the surface of the end cap and of the crown portion of the bumper body and the flanges of the elongate holder define a smooth, generally flush end shape for the bumper body guard. Preferably, the end cap is of a color which is the same as that of the crown portion of the bumper body.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination, an elongated holder member of uniform cross section, said holder including a lower web having a substantially planar under surface, spaced walls extending out of the plane of said web and defining therebetween an elongated channel, said walls having ledges projecting into said channel and confronting each other in spaced relationship, said walls having flanges projecting laterally therefrom and extending to the lower plane of said web and defining downwardly-opening slots flanking opposite sides of said walls; an elongated bumper body of a substantially yieldable material and having a uniform cross section, said bumper body having a lower base substantially conforming to the cross section of said holder groove and snugly received therein, said bumper body including laterally opening recesses received on said confronting ledges, said bumper body including an enlarged, central, dome-shaped crown including undercut shoulders extending the length thereof and abuttingly engaged on the outer surface of said holder walls; fastening means extending through said web for attaching the lower surface of said web and said flanges in substantially flush engagement upon a surface upon which the holder is mounted; and at least one end cap connected to one end of said holder and including portions frictionally received in said slots flanking opposite sides of said walls.

2. The combination as set forth in claim 1 wherein said ledges are at the outermost edge of the upstanding walls and said shoulders rest on the outer surfaces of said ledges.

3. The combination as set forth in claim 1 wherein said end cap is of resilient material to hold the body against forces of sliding removal of the body from the member, said end cap includes a head and a pair of legs extending out of one side of the head, each said leg being smaller in cross section than said slots and with their respective outer edges being spaced at their proximal ends a distance just less than the distance between said maximum for sliding receipt in the slots to hold the bumper body in engagement with the holder member.

4. The combination as set forth in claim 3 wherein an intermediate portion of each of the legs of said end cap is of reduced cross-sectional area to facilitate flexing thereof and said legs are biased such that the distal ends are normally spaced apart a distance greater than the distance between said slots and yieldable on the application of opposing forces to a distance just less than the distance between the slots for sliding receipt in said slots to hold the bumper body in engagement with the holder.

References Cited
UNITED STATES PATENTS

| | | | |
|---|---|---|---|
| 1,476,509 | 12/1923 | Hart | 296—135 |
| 1,972,283 | 9/1934 | Zimmers | 280—163 |
| 2,959,146 | 11/1960 | Erkert | 114—219 |

FOREIGN PATENTS 1,039,729  5/1953  France.

ARTHUR L. LA POINT, *Primary Examiner.*

H. BELTRAN, *Assistant Examiner.*